United States Patent
Yang et al.

(10) Patent No.: US 9,258,163 B2
(45) Date of Patent: Feb. 9, 2016

(54) SYSTEMS AND METHODS FOR PHASE ROTATING DUPLICATE FRAMES IN WIRELESS LAN TRANSMISSION

(71) Applicant: QUALCOMM Incorporated, San Diego, CA (US)

(72) Inventors: Lin Yang, San Diego, CA (US); Bin Tian, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 14/091,052

(22) Filed: Nov. 26, 2013

(65) Prior Publication Data

US 2014/0153507 A1    Jun. 5, 2014

Related U.S. Application Data

(60) Provisional application No. 61/734,496, filed on Dec. 7, 2012, provisional application No. 61/732,001, filed on Nov. 30, 2012.

(51) Int. Cl.
*H04L 27/26* (2006.01)

(52) U.S. Cl.
CPC ........ *H04L 27/2621* (2013.01); *H04L 27/2602* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 8,374,074 B2 | 2/2013 | Liao et al. | |
| 8,385,443 B2 | 2/2013 | Van Nee et al. | |
| 2011/0222519 A1 | 9/2011 | Liao et al. | |
| 2011/0281534 A1* | 11/2011 | Liao et al. | 455/127.1 |
| 2012/0051454 A1 | 3/2012 | Zheng et al. | |
| 2012/0269069 A1 | 10/2012 | Porat et al. | |

FOREIGN PATENT DOCUMENTS

WO    WO-2013086311 A1    6/2013

OTHER PUBLICATIONS

International Search Report and Written Opinion—PCT/US2013/072375—ISA/EPO—Mar. 20, 2014.

(Continued)

*Primary Examiner* — Hoon J Chung
*Assistant Examiner* — Zhensheng Zhang
(74) *Attorney, Agent, or Firm* — Knobbe Martens Olson & Bear LLP

(57) ABSTRACT

Methods, devices, and computer program products for optimally phase rotating duplicate frames in wireless LAN transmissions are disclosed. In one aspect, phase rotation sequences may be chosen in order to minimize a peak-to-average power ratio (PAPR) of a frame or data unit, or of a portion of a frame or data unit, where the frame contains a plurality of identical frequency segments, such as a duplicate frame. The method involves selecting a frame bandwidth, and then selecting a phase rotation sequence based upon the frame bandwidth. The method further includes generating a frame including a number of identical 1 MHz frequency segments, and rotating some of those segments relative to other segments, based on the selected phase rotation sequence. The method further includes transmitting the frame.

12 Claims, 9 Drawing Sheets

(56) References Cited

OTHER PUBLICATIONS

Park M, "Specification Framework for TGah-SFD-D14.x ; 11-13-0599-00-00-ah-tgah-sfd-d14-x", IEEE SA MENTOR; 11-13-0599-00-00AH-TGAH-SFD-D14-X, IEEE-SA MENTOR, Piscataway, NJ USA, vol. 802.11ah, May 15, 2013, pp. 1-76, XP068054133, [retrieved on May 15, 2013].

Zhang H, "1MHz Dup mode ; 11-12-1313-00-00ah-1mhz-dup-mode", IEEE SA MENTOR; 11-12-1313-00-00AH-1MHZ-DUP-MODE, IEEE-SA MENTOR, Piscataway, NJ USA, vol. 802.11ah, Nov. 12, 2012, pp. 1-11, XP068040154, [retrieved on Nov. 12, 2012].

* cited by examiner

| Bandwidth in MHz of the 1MHz DUP Frame | Phase rotation sequence based on criteria 1 (Minimizing LTF PAPR) | | Phase rotation sequence based on criteria 2 (Minimizing data PAPR of MCS0) | |
|---|---|---|---|---|
| | Best Sequence | PAPR with best sequence (LTF, MCS0 data) | Best Sequence | PAPR with best sequence (LTF, MCS0 data, MCS0 rep2 data) |
| 2 | [1 1] | (5.66, 12.94) | [1 -1] | (6.59, 11.65, 12.09) |
| 4 | [1 1 1 -1] | (5.60, 12.00) | [1 -1 1 1] | (6.02, 11.22, 12.26) |
| 8 | [1 -1 -1 -1 -1 1 -1] [1 -1 1 1 1 1 -1 -1] | (5.60, 11.68) (5.60, 11.68) | [1 -1 1 -1 -1 1 -1 -1] | (9.02, 11.54, 12.25) |

FIG. 6B

| Bandwidth in MHz of the 1MHz DUP Frame | Phase rotation sequence based on criteria 1 (Minimizing LTF PAPR) | | Phase rotation sequence based on criteria 2 (Minimizing data PAPR of MCS0 rep 2) | |
|---|---|---|---|---|
| | Best Sequence | PAPR with best sequence (LTF, MCS0 rep 2 data) | Best Sequence | PAPR with best sequence (LTF, MCS0 data, MCS0 rep2 data) |
| 2 | [1 1] | (5.66, 14.08) | [1 -1] | (6.59, 11.65, 12.09) |
| 4 | [1 1 1 -1] | (5.60, 13.25) | [1 i -i -1] | (6.59, 11.58, 11.81) |
| 8 | [1 -1 -1 -1 -1 1 -1]<br>[1 -1 1 1 1 1 -1 -1] | (5.60, 12.95)<br>(5.60, 12.94) | [1 -1 1 -1 1 -1 -1 -1] | (10.11, 11.58, 12.22) |

SYSTEMS AND METHODS FOR PHASE ROTATING DUPLICATE FRAMES IN WIRELESS LAN TRANSMISSION

CLAIM OF PRIORITY UNDER 35 U.S.C. §119

The present application for patent claims priority to Provisional Application No. 61/732,001 entitled "SYSTEMS AND METHODS FOR PHASE ROTATING DUPLICATE FRAMES IN WIRELESS LAN TRANSMISSIONS" filed Nov. 30, 2012, and assigned to the assignee hereof and hereby expressly incorporated by reference herein. The present application for patent further claims priority to Provisional Application No. 61/734,496 entitled "SYSTEMS AND METHODS FOR PHASE ROTATING DUPLICATE FRAMES IN WIRELESS LAN TRANSMISSIONS" filed Dec. 7, 2012, and assigned to the assignee hereof and hereby expressly incorporated by reference herein.

BACKGROUND

1. Field

The present application relates generally to wireless communications, and more specifically to systems, methods, and devices for optimally phase rotating duplicate frames in wireless local area network (WLAN) transmissions. Certain aspects herein relate to determining phase rotations for use with frames which contain a number of identical frequency segments, such that the phase rotations will reduce the peak-to-average power ratio (PAPR) of the frame.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. In some types of wireless networks, it may be useful to transmit duplicate (DUP) frames, which contain a number of identical frequency segments. For example, a DUP frame may contain a plurality of identical frequency segments, such as containing a 1 MHz segment which is transmitted over 2, 4 or 8 MHz by duplicating the 1 MHz segment 2, 4 or 8 times to fill up that bandwidth.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a wireless communication apparatus, comprising a processor configured to select a frame bandwidth of one of 2 MHz, 4 MHz, and 8 MHz, select a phase rotation sequence based at least in part on the frame bandwidth, comprising if the frame bandwidth is 2 MHz, selecting a phase rotation sequence of [1 −1], or a scaled version of [1 −1], if the frame bandwidth is 4 MHz, selecting a phase rotation sequence of [1 j −j −1], or a scaled version of [1 j −j −1], if the frame bandwidth is 8 MHz, selecting a phase rotation sequence of [1 −1 1 1 1 1 −1 −1], or a scaled version of [1 −1 1 1 1 1 −1 −1], generate a frame of the selected bandwidth, the frame having a plurality of identical 1 MHz frequency segments wherein at least one of the identical frequency segments is rotated with respect to at least one other identical frequency segment based upon the selected phase rotation sequence. The device also includes a transmitter configured to transmit the frame having a plurality of identical frequency segments.

In one aspect, a method of transmitting a duplicate frame over a wireless communication network is disclosed, the method comprising selecting a frame bandwidth of one of 2 MHz, 4 MHz, and 8 MHz, selecting a phase rotation sequence based at least in part on the frame bandwidth, comprising if the frame bandwidth is 2 MHz, selecting a phase rotation sequence of [1 −1], or a scaled version of [1 −1], if the frame bandwidth is 4 MHz, selecting a phase rotation sequence of [1 j −j −1], or a scaled version of [1 j −j −1], if the frame bandwidth is 8 MHz, selecting a phase rotation sequence of [1 −1 1 1 1 1 −1 −1], or a scaled version of [1 −1 1 1 1 1 −1 −1], generating a frame of the selected bandwidth, the frame having a plurality of identical 1 MHz frequency segments, wherein at least one of the identical frequency segments is rotated with respect to at least one other identical frequency segment based upon the selected phase rotation sequence; and transmitting the frame having a plurality of identical frequency segments.

In one aspect, a non-transitory, computer readable medium comprising instructions that when executed cause a processor in a device to perform a method of transmitting a duplicate frame over a wireless communication network is disclosed, the method comprising selecting a frame bandwidth of one of 2 MHz, 4 MHz, and 8 MHz, selecting a phase rotation sequence based at least in part on the frame bandwidth, comprising if the frame bandwidth is 2 MHz, selecting a phase rotation sequence of [1 −1], or a scaled version of [1 −1], if the frame bandwidth is 4 MHz, selecting a phase rotation sequence of [1 j −j −1], or a scaled version of [1 j −j −1], if the frame bandwidth is 8 MHz, selecting a phase rotation sequence of [1 −1 1 1 1 1 −1 −1], or a scaled version of [1 −1 1 1 1 1 −1 −1], generating a frame of the selected bandwidth, the frame having a plurality of identical 1 MHz frequency segments, wherein at least one of the identical frequency segments is rotated with respect to at least one other identical frequency segment based upon the selected phase rotation sequence; and transmitting the frame having a plurality of identical frequency segments.

BRIEF DESCRIPTION OF THE DRAWINGS

FIG. 6B shows a chart of phase rotation sequences in 2, 4 and 8 MHz bandwidths optimized based on one of two criteria, and the resulting PAPR values FIG. 6C shows a chart of phase rotation sequences in 2, 4 and 8 MHz bandwidths optimized based on one of two criteria, and the resulting PAPR values

DETAILED DESCRIPTION

Figure 1:
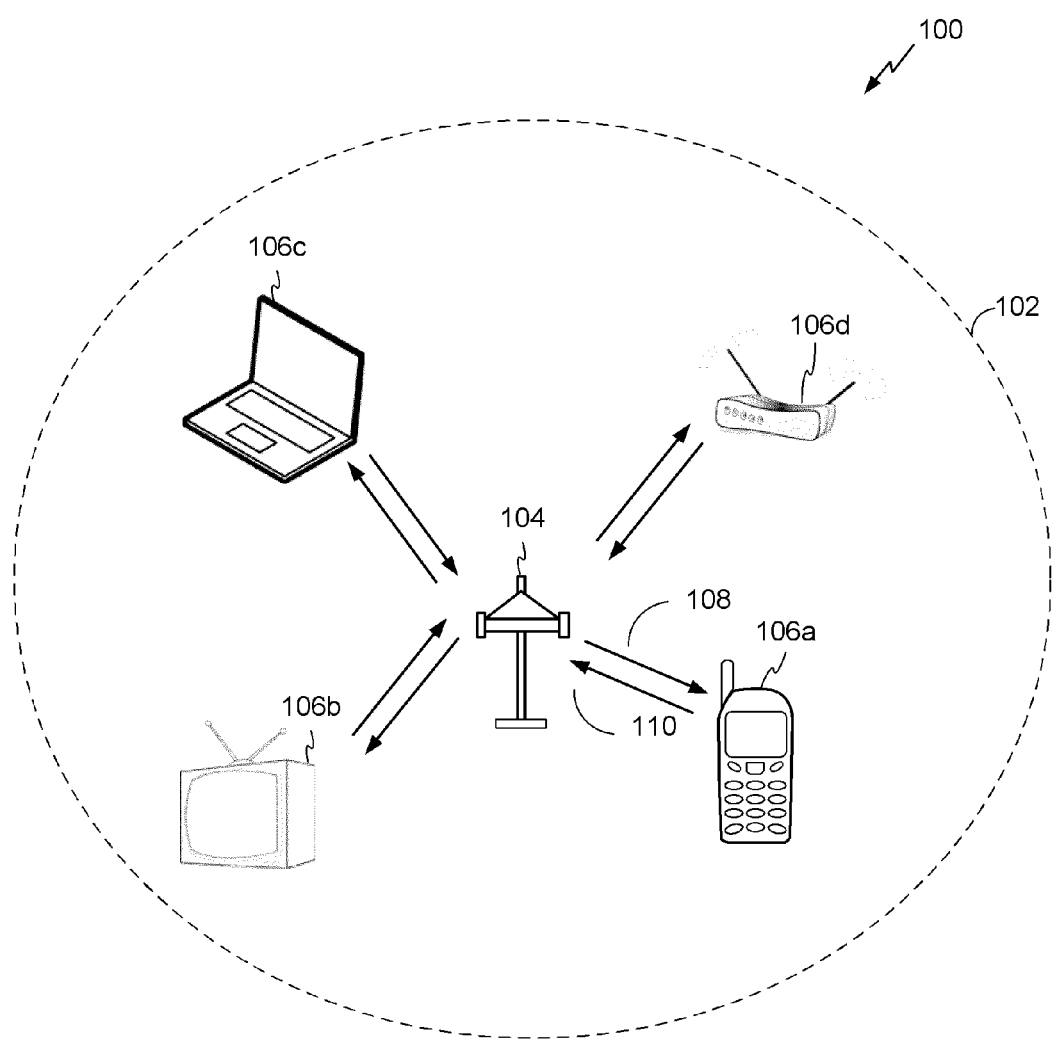
FIG. 1 illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which includes use of sub-1 GHz ("S1G") bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11 ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, commonly known as "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare.

They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11 ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
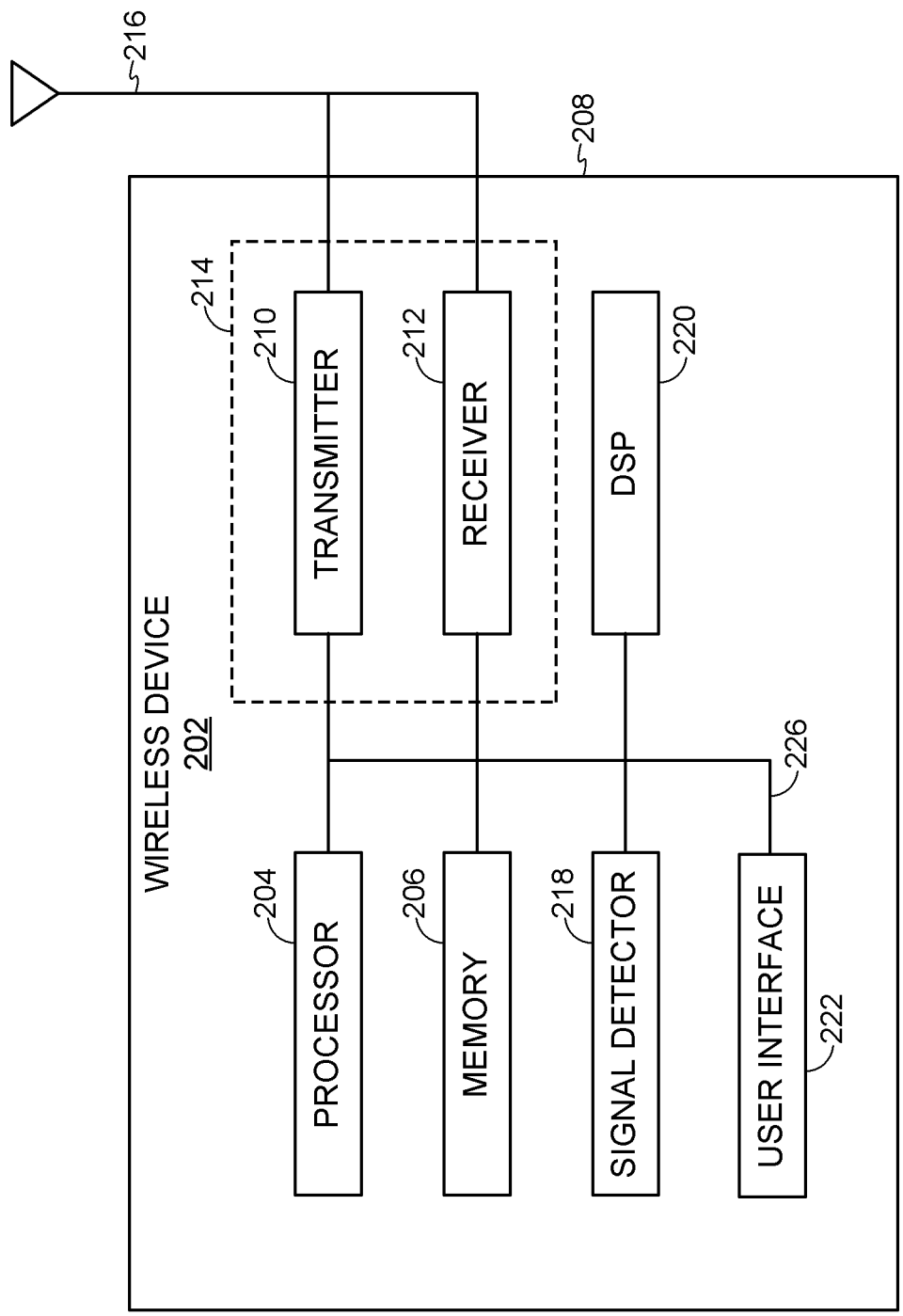
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
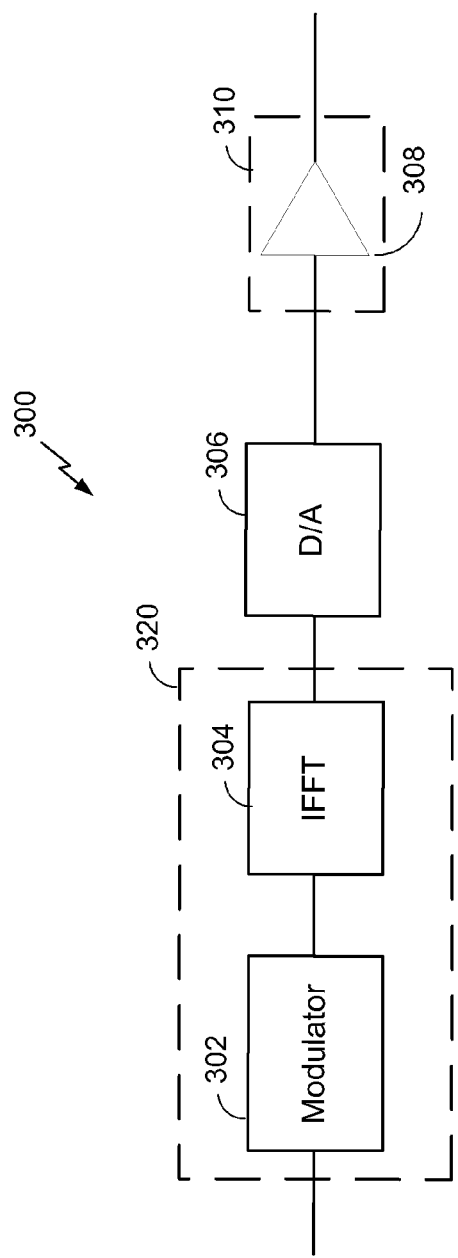
FIG. 3 shows a functional block diagram of exemplary components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates a transmitter module 300 that may be utilized in the wireless device 202 to transmit wireless communications. The components illustrated in FIG. 3 may be used, for example, to transmit OFDM communications.

The transmitter module 300 may comprise a modulator 302 configured to modulate bits for transmission. For example, if the transmitter module 300 is used as a component of wireless device 202 in FIG. 2, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The transmitter module 300 may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 320. In some aspects, however, one or both of the modulator 302 and the transform module 304 may be implemented in other components of wireless device 202, such as in the processor 204.

Generally, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the transmitter module 300 may further comprise a digital to analog converter 306 configured to convert the output of the transform module into an analog signal. For example, the time-domain output of the transform module 306 may be converted to a baseband OFDM signal by the digital to analog converter 306. In some aspects, portions of the transmitter module 300 may be included in wireless device 202 from FIG. 2. For example, the digital to analog converter 306 may be implemented in the processor 204, the transceiver 214, or in another element of the wireless device 202.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using a processor and/or the DSP 320, for example using the modulator 302 and the transform module 304 as discussed above. Data units that may be generated and transmitted as discussed above are described in additional detail below with respect to FIGS. 5-7.

Figure 4:
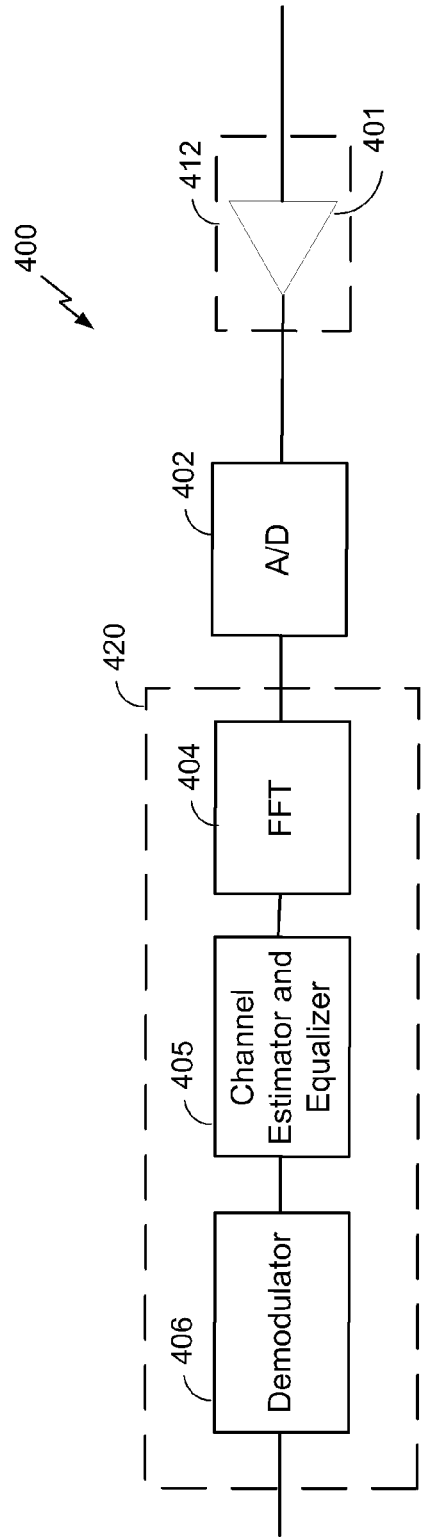
FIG. 4 shows a functional block diagram of exemplary components that may be utilized in the wireless device of FIG. 2 to receive wireless communications.

FIG. 4 illustrates a receiving module 400 that may be utilized in the wireless device 202 to receive wireless communications. The components illustrated in FIG. 4 may be used, for example, to receive OFDM communications. In some aspects, the components illustrated in FIG. 4 are used to receive data units that include one or more training fields, as will be discussed in additional detail below. For example, the components illustrated in FIG. 4 may be used to receive data units transmitted by the components discussed above with respect to FIG. 3.

The receiver 412 is configured to receive one or more packets or data units in a wireless signal. Data units that may be received and decoded or otherwise processed as discussed below are described in additional detail with respect to FIGS. 5-7.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The receiving module 400 may comprise an analog to digital converter 402 configured to convert the amplified wireless signal from the receiver 412 into a digital representation thereof. Further to being amplified, the wireless signal may be processed before being converted by the digital to analog converter 402, for example by being filtered or by being downconverted to an intermediate or baseband frequency. In some aspects, the analog to digital converter 402 may be implemented in the processor 204 of FIG. 2, the transceiver 214, or in another element of the wireless device 202.

The receiving module 400 may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The receiving module 400 may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The receiving module 400 may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation.

In some aspects, where the receiving module 400 is implemented as a portion of wireless device 202, the bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 may be implemented in another component of wireless device 202, such as in the processor 204.

As discussed above, the wireless signal received at the receiver 412 comprises one or more data units. These data units may be decoded, evaluated and/or processed using the components described above. For example, a processor and/or the DSP 420 may be used to decode data symbols in the data units using the transform module 404, the channel estimator and equalizer 405, and the demodulator 406.

Data units exchanged by the AP 104 and the STA 106 may include control information or data. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. For example, the training fields may include one or more long training field (LTF) and one or more short training field (STF). The payload may comprise a Media Access Control (MAC) header and/or user data. The payload may be transmitted using one or more data symbols, such as BPSK symbols or QPSK symbols.

Figure 5:
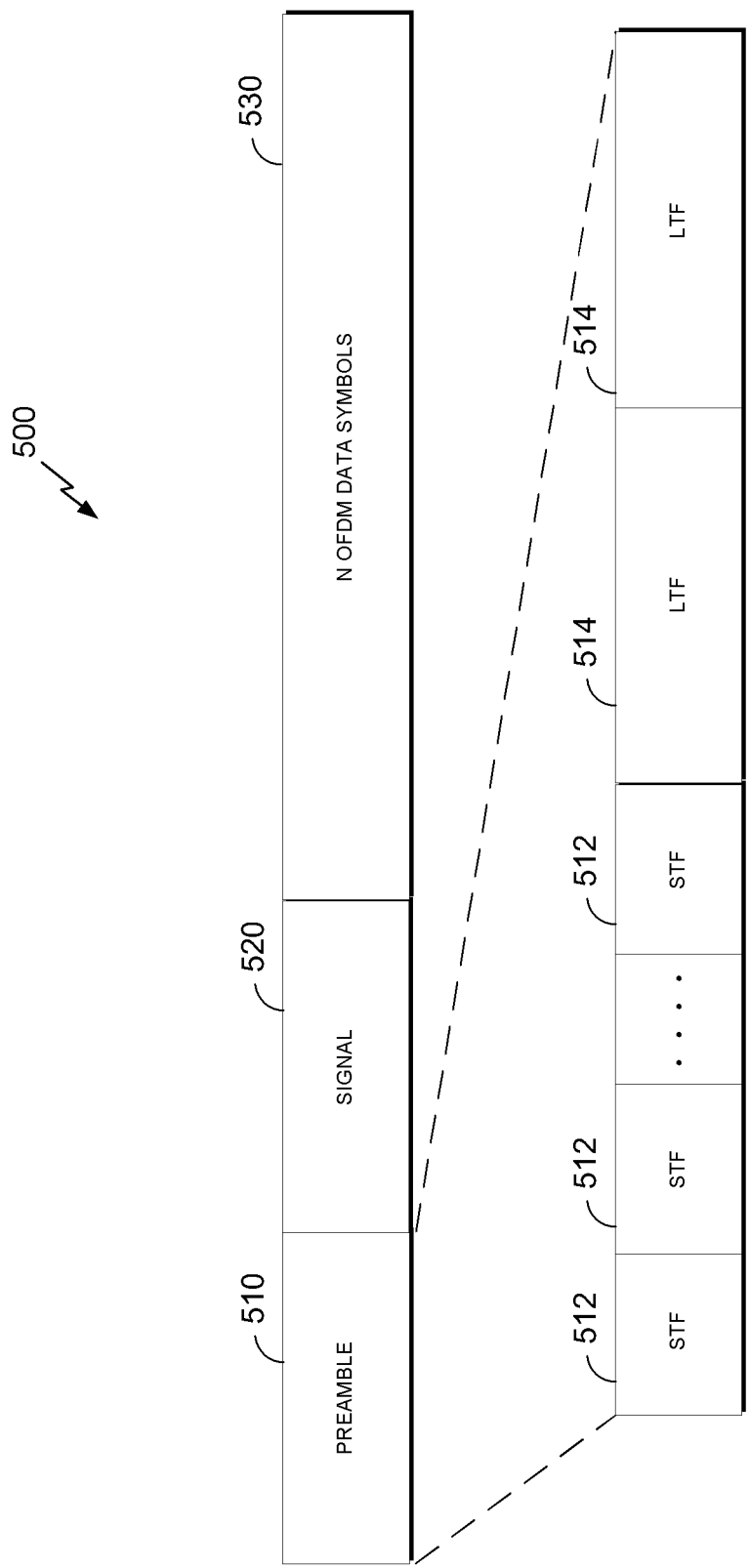
FIG. 5 illustrates an example of a physical layer data unit.

FIG. 5 illustrates an example of a data unit 500. The data unit 500 may comprise a PPDU for use with the wireless device 202. The data unit 500 may be used by legacy devices or devices implementing a legacy standard, such as a previous version of an IEEE 802.11 standard.

The data unit 500 includes a preamble 510. The preamble 510 may comprise a variable number of repeating STF 512 symbols, and one or more LTF 514 symbols. In one implementation, tenrepeated STF 512 symbols may be sent followed by two LTF 514 symbols. The transmitted STF 512 symbols may be used by the receiver 412 to perform automatic gain control to adjust the gain of the receive amplifier 401, as discussed above. Furthermore, the transmitted STF 512 symbols may be used by the receiver 412 for packet detection, rough timing, and other settings. The transmitted LTF 514 symbols may be used by the channel estimator and equalizer 405 to form an estimate of the channel over which the data unit 500 is received.

Following the preamble 510 in the data unit 500 is a SIGNAL field 520. The SIGNAL field 520 may be one OFDM symbol in length, and may include various information relating to the transmission rate, the length of the data unit 500, and the like. Following the SIGNAL field 520, the data unit 500 additionally includes a variable number of data symbols 530, such as OFDM data symbols. Any number of data symbols 530 may be transmitted in the data unit 500, based upon the amount of data which needs to be transmitted.

When the data unit 500 is received at the receiving module 400, the size of the data unit 500 including the LTF 514 may be computed based on the SIGNAL field 520, and the STF 512 may be used by the receiver 412 to adjust the gain of the receive amplifier 401. Further, a LTF 514 may be used by the channel estimator and equalizer 405 to form an estimate of the channel over which the data unit 500 is received. The channel estimate may be used by the DSP 220 to decode the plurality of data symbols 522 that follow the preamble 510.

The data unit 500 illustrated in FIG. 5 is only an example of a data unit that may be used in the system 100 and/or with the wireless device 202. Those having ordinary skill in the art will appreciate that a greater or fewer number of STF 412 symbols, LTF 514 symbols, and the data symbols 530 may be included in the data unit 500. In addition, one or more symbols or fields may be included in the data unit 500 that are not illustrated in FIG. 5, and one or more of the illustrated fields or symbols may be omitted.

When transmitting using ODFM, a number of different orthogonal subcarriers may be used to transmit information. For example, the number of subcarriers that are used may depend on a variety of considerations. These considerations include the available frequency bands for use, the available bandwidth and any associated regulatory constraints. The number of subcarriers used in an OFDM communication is correlated to the size of an FFT module, as each subcarrier is an input to an IFFT module to create the OFDM signal to be transmitted. As such, in some implementations a larger FFT size (e.g., a FFT module with 64, 128, 256, or 512 inputs) maybe desired to achieve a larger bandwidth, as such a larger FFT size may allow more subcarriers to be used to transmit information. In other implementations, a smaller FFT size may be used for transmitting data in a narrow bandwidth. The number of subcarriers, and therefore FFT size, may also be chosen so as to comply with certain regulatory domains that may have certain bandwidth restrictions. In some aspects, the IEEE 802.11ah standard dictates that an FFT size of 32 may be used for each 1 MHz of bandwidth. Wireless device 202 may include several transform modules 304 of different sizes, in order to allow the wireless device to transmit and receive messages with various numbers of subcarriers. In some aspects, these transform modules 304 may be implemented as FFT or IFFT modules. In some aspects, at least one of the transform modules 304 may be a 32 point size IFFT or FFT module according to certain aspects described herein.

The number of subcarriers may be characterized by a spectral line used to map the subcarriers to indices for identifying each subcarrier. The spectral line may define indices that span a negative and positive range where half of the subcarriers are represented on each of the negative and positive ranges. For example, for 64 subcarriers, each subcarrier may be mapped to indices from −32 to 31 to define the spectral line. When using 32 subcarriers (i.e., tones), the spectral line may defined to map each subcarrier to indices from −16 to 15.

The number of subcarriers used and therefore FFT size may determine the size of the training sequence such as the STF 512 and LTF 514 transmitted as described above. For example, the STF 512 symbols and the LTF 514 symbols may be transmitted on each of the subcarriers which is used in a data unit. Thus, a data unit which uses more subcarriers may contain STF 512 symbols and LTF 514 symbols which also use more subcarriers.

Each data unit which is sent on a wireless network may be characterized by its peak-to-average power ratio (PAPR). The PAPR may be defined as the peak amplitude of an OFDM signal divided by the root-mean-square of the amplitude of the OFDM signal. For example, an OFDM signal may be expressed as:

$$x(t) = \sum_{k=0}^{N-1} X_k e^{j\frac{2\pi kt}{T}}$$

where Xk represent data symbols, N are the number of subcarriers, and T is time for the OFDM symbol. The PAPR may be calculated as:

$$PAPR = \frac{\max|x(t)|^2}{E[|x(t)|^2]}$$

where E defines a function for the mean square value of the signal.

As an OFDM signal may be a combination of a large number of symbols each with different amplitudes, a PAPR value for the OFDM signal may be fairly large. A higher PAPR value may result in distortion of the OFDM signal which may be problematic. For example, if the signal is passed through nonlinear components on a receiving device, such as power amplifier (PA) 308, a OFDM signal with a higher PAPR value may suffer from signal distortion. This signal distortion may result in increased noise in the signal and may also result in interference between subcarriers. Accordingly, the effective range of such an OFDM signal with a higher PAPR value may be reduced. Thus, it may be beneficial to transmit OFDM signals with lower PAPR values when it is possible.

In some embodiments, it may be beneficial to transmit duplicate (DUP) frames, which is a frame composed of a number of identical frequency segments. For example, a DUP frame may be useful for clearing a wireless medium, to allow a wireless device to transmit without other wireless devices transmitting simultaneously in the wireless medium. For example, in a wireless network, devices may transmit a Request to Send (RTS) message to request a time slot to send a packet. In response, an AP or another device may transmit a Clear to Send (CTS) message, which may reserve the wireless medium for a particular device for a given duration. Accordingly, it may be desirable for as many devices are possible to receive these messages, so that these devices may refrain from transmitting information on the wireless medium during this reserved time. In some aspects, low bandwidth devices may only be able to receive messages on a portion of the total bandwidth that is being used by an AP and by other wireless devices. For example, in the IEEE 802.11 ah standard, there may be certain devices which can transmit and receive information on an 8 MHz bandwidth. However, there may be other devices which can transmit and receive information only on a single 1 MHz portion of that 8 MHz bandwidth. These devices may include certain low-power devices. Thus, in some aspects, it may be beneficial to transmit RTS-CTS messages using a DUP frame, wherein a 1 MHz RTS-CTS message is transmitted on each 1 MHz portion of the 8 MHz bandwidth. This DUP frame may allow each low-power 1 MHz device to receive the RTS-CTS message, regardless of which 1 MHz portion of the 8 MHz bandwidth the low-power device is using.

Accordingly, the IEEE 802.11ah standard has adopted a 1 MHz DUP frame format, in which a DUP frame may be made up of a number of identical 1 MHz frequency segment portions. For example, in some embodiments, a 2, 4 or 8 MHz DUP frame may be constructed using 2, 4 or 8 identical 1 MHz frequency segments. The DUP frames may be used, as described above, to transmit RTS-CTS messages. The use of DUP frames for this purpose may allow low-bandwidth devices to receive the RTS-CTS messages, and therefore to defer to the CTS message for the duration indicated in the CTS message. For example, prior to an 8 MHz transmission, it may be beneficial to transmit an 8 MHz DUP frame, such as a CTS frame. This may clear the full 8 MHz bandwidth, so that a device may transmit on the 8 MHz bandwidth without another device attempting to transmit using the same bandwidth.

However, transmitting DUP frames may cause a very large PAPR value, as the DUP frame may contain 2, 4 or 8 identical 1 MHz frequency segments. Because these frequency segments are identical to each other, they will add constructively, and thus the PAPR level for the DUP frame may be very high. This higher PAPR level may force devices to operate at a higher PA back-off, in order to avoid signal distortion, which may result in increased noise and interference between subcarriers. However, operating at a higher PA back-off is also problematic, as this may lead to a lower power-added efficiency of the PA, and hence, more battery consumption for the device. In some aspects, each 1 MHz frequency segment may contain 32 subcarriers. Thus, it is desired to provide a system and method capable of providing DUP frames composed of 32 subcarrier, 1 MHz, identical frequency segments with a reduced PAPR.

In some embodiments, it may be beneficial to reduce the PAPR of a DUP frame through phase rotation. For example, a DUP frame includes a number of identical frequency segments, such as a number of 1 MHz identical frequency segments. If each segment is identical, these segments may, when transmitted with each other, add up constructively. However, if certain segments are rotated with respect to other segments, this phase rotation may prevent the signals of the DUP frame from adding up constructively, and may therefore reduce the PAPR value of the signal, and enable devices to operate more efficiently and at a lower PA back-off.

Figure 5A:
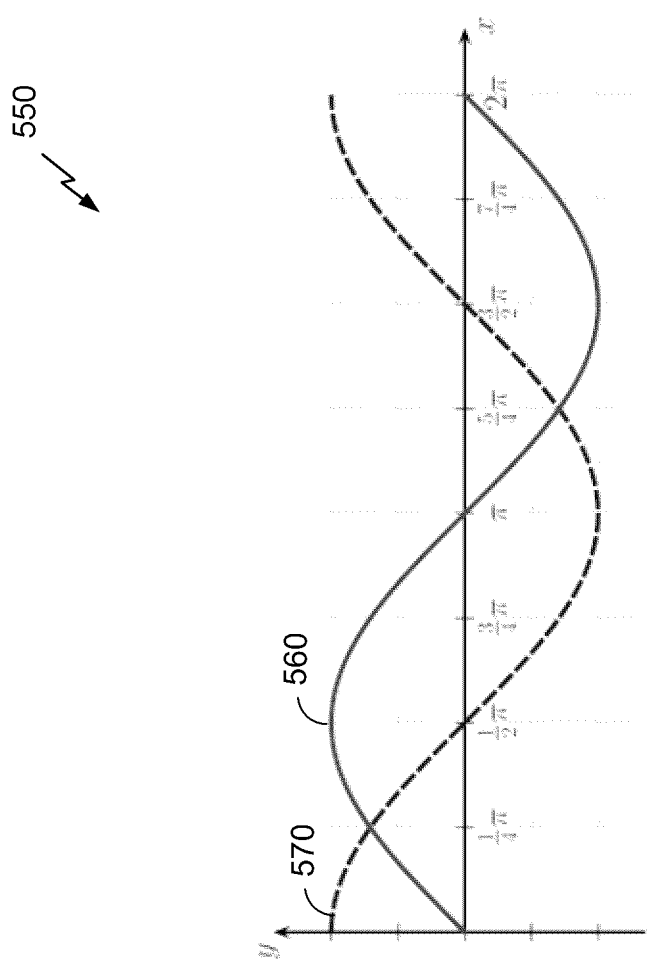
FIG. 5A is an illustration of two waves which are identical, but where one wave has been phase rotated by a factor of $\pi/2$.

Generally, a phase rotation sequence may alter the phase of a portion of a data packet, with respect to another portion of the same data packet. Such a sequence may rotate the transmitted values by a phase rotation factor of 1, −1, j, or −j. The phase rotation factor of 1 may not change the phase of a signal. The phase rotation factor of −1 may change the phase of a signal by $\pi$ radians or 180°. The phase rotation factor of j may change the phase of a signal by $\pi/2$ radians or 90°. The phase rotation factor of −j may change the phase of a signal by −$\pi/2$ radians or −90°. So long as a receiving device is aware of the phase rotation sequence used, it may be simple to use the rotation factor in order to decode the data transmitted in a packet with rotated portions. For example, in some aspects, certain phase rotations may be equivalent to altering the phase of an electromagnetic wave by a factor of −$\pi/2$, 0, $\pi/2$, or $\pi$ radians. In a DUP frame, a number of different subcarriers contain duplicated values with each other. For example, in an 8 MHz DUP frame which contains 8 duplicated 1 MHz frequency segments, each subcarrier may be duplicated 8 times, once in each of the eight 1 MHz frequency segments. If each frequency segment is transmitted at the same phase, these duplicated subcarriers may add constructively, increasing the PAPR value for the packet. However, if some of these 1 MHz frequency segments have their phases rotated with respect to other 1 MHz frequency segments, such constructive addition of the duplicated subcarriers may be avoided. For example, FIG. 5A is an illustration 550 of two waves which are identical, but where one wave has been phase rotated by a factor of π/2. For example, a first wave 560 has been phase shifted by a factor of π/2 with respect to a second wave 570. Similarly, certain frequency segments of a DUP frame may be phase rotated with respect to other frequency segments of a DUP frame.

Phase rotation sequences, which may provide instructions for rotating certain identical frequency segments of a DUP frame, may be constructed in a number of ways. For example, it may be desirable to calculate phase rotation sequences which minimize PAPR of certain portions of a data unit, such as data unit 500. In a DUP frame, one or more portions, or all portions, of a data unit may be duplicated. In a 2, 4 or 8 MHz DUP frame, this may require that 1 MHz frequency segments be duplicated 2, 4 or 8 times. Thus, it may be desirable to calculate a phase rotation sequence which minimizes PAPR for certain portions of the data unit. For example, a phase rotation sequence may be calculated which reduces PAPR for an LTF portion of a data unit, such as LTF 514 of data unit 500. Alternatively, a phase rotation sequence may be calculated which reduces PAPR values for the data portion of a data unit.

Figure 6A:
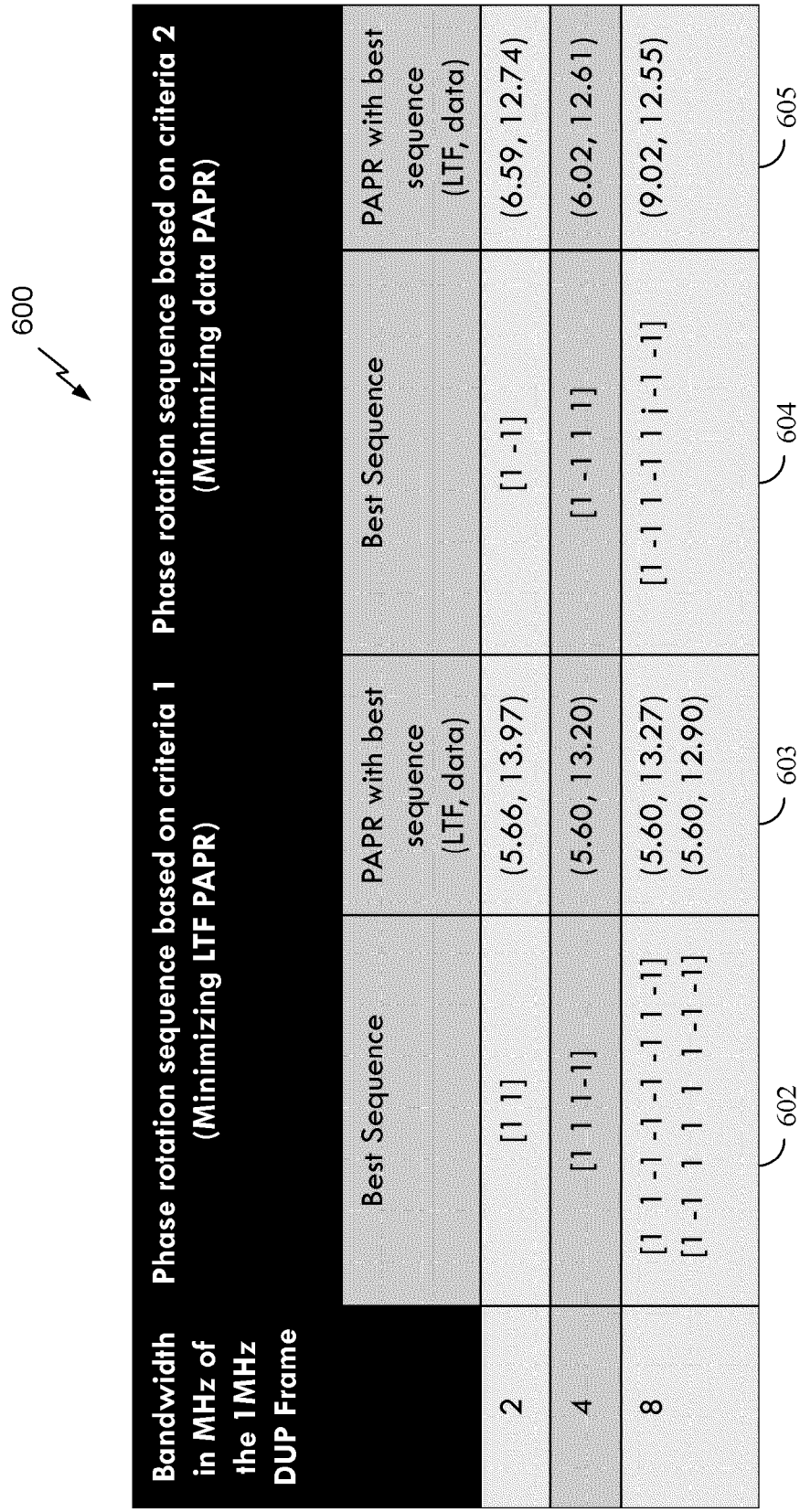
FIG. 6A shows a chart of phase rotation sequences in 2, 4 and 8 MHz bandwidths optimized based on one of two criteria, and the resulting peak-to-average power ratio (PAPR) values.

FIG. 6A shows a chart 600 of phase rotation sequences in 2, 4 and 8 MHz bandwidths optimized based on one of two criteria, and the resulting PAPR values. The first criteria is a phase rotation sequence which is designed to minimize the PAPR value of an LTF portion of the packet. Column 602 illustrates the phase rotation sequences which minimize the PAPR value of the LTF portion of the packet for a given packet bandwidth. Note that in these phase rotation sequence, each number indicates a phase rotation factor to be used for 32 subcarriers. For example, in the IEEE 802.11 ah standard, each 1 MHz of bandwidth is divided into 32 subcarriers. Accordingly, a 2 MHz packet includes 64 subcarriers, a 4 MHz packet includes 128 subcarriers, and an 8 MHz packet includes 256 subcarriers. Thus, for example, a phase rotation sequence for an 8 MHz packet includes 8 different numbers, with each number being a phase rotation factor to be used for 32 sequential subcarriers. For example, if the subcarriers of an 8 MHz DUP frame were numbered from −128 to +127, and a phase rotation sequence of [1 1 −1 −1 −1 −1 1 −1] was used, both the first 32 subcarriers and the second 32 subcarriers, that is the subcarriers from −128 to −65, would have a phase rotation factor of 1. Similarly, subcarriers from −64 to 63 would have a phase rotation factor of −1. Subcarriers from 64 to 95 would have a phase rotation factor of 1. Finally, subcarriers from 96 to 127 would have a phase rotation factor of −1.

Column 603 gives the PAPR values for a packet of the given bandwidth which uses the given phase rotation sequence. Note that two PAPR values are provided for each bandwidth: a first PAPR value for the LTF portion of the packet, and a second PAPR value for the data portion of the packet. Because the LTF portion of the packet is a pre-defined series of symbols, the PAPR value for this portion of the packet is an exact value which is calculated based upon the pre-defined series of symbols of the LTF. However, note that the data portion of the packet may vary, as a packet may contain any data. Because packets contain different data, the PAPR value of the data portion of the packet will vary, based upon the data in the packet. In order to calculate a PAPR value of the data portion of the packet, a large number of different possible packets were generated, with different data. These packets were each rotated according to the provided phase rotations, and the PAPR values for each of these packets as calculated. The PAPR values for each of these packets were formed into a cumulative distribution function (CDF). The PAPR values listed in column 603 represent a PAPR value that is higher that the PAPR value of 99.98% of actual packets of the given bandwidth. Because of the different data transmitted by each packet, packets may have varying PAPR levels with the same phase rotation sequence, however, only 0.02% (1-2e$^{-4}$) of packets will have PAPR values for the data portion of the packet higher than the listed value.

Similarly, column 604 includes phase rotation sequences which were calculated based on the second criteria, which is to minimize the PAPR value of the data portion of the packet. Column 605 includes the PAPR values which were found using the sequences in column 604. As above, approximately 99.98% of packets will have a lower PAPR value for the data portion of the packet than the listed PAPR value.

For example, it has been found that for a 2 MHz bandwidth signal, containing two identical 1 MHz frequency sequences, the optimal phase rotation sequence to minimize the PAPR value of the LTF portion of a data unit is [1 1]. When this phase rotation sequence is used, the PAPR value of the LTF portion of the packet will be 5.66 dB. However, the PAPR value for the data portion of the packet will be 13.97 dB. As before, the actual PAPR value for a data portion of a packet depends upon the data contained in the packet. However, only 0.02% of packets will have a higher PAPR value for the data portion of the packet than the given value.

It has also been found that for a 4 MHz bandwidth signal, containing four identical 1 MHz frequency sequences, the optimal phase rotation sequence to minimize the PAPR value of the LTF portion of a data unit is [1 1 1 −1]. This sequence results in a PAPR value for the LTF portion of a data unit of 5.60 dB, and a PAPR value for the data symbol portion of 13.20 dB. As before, the actual PAPR value for a data portion of a packet depends upon the data contained in the packet. However, only 0.02% of packets will have a higher PAPR value for the data portion of the packet than the given value.

It has also been found that for an 8 MHz bandwidth signal, containing eight identical 1 MHz frequency sequences, the optimal phase rotation sequence to minimize the PAPR value of the LTF portion of a data unit is either [1 1 −1 −1 −1 −1 1 −1] or [1 −1 1 1 1 1 −1 −1]. Each of these sequences results in a PAPR value for the LTF portion of a data unit of 5.60 dB, and a PAPR value for the data symbol portion of 13.27 dB or 12.90 dB. As before, the actual PAPR value for a data portion of a packet depends upon the data contained in the packet. However, only 0.02% of packets will have a higher PAPR value for the data portion of the packet than the given value.

In FIG. 6A, two criteria for phase rotation sequences were presented. In the first criteria, the PAPR value for the LTF portion of the packet was minimized. In the second criteria, the PAPR value for the data portion of the packet was minimized. Phase rotation sequences may also be designed to minimize the PAPR of other portions of a packet/data unit in a DUP frame. For example, it may be desirable to reduce the PAPR values of all portions of the packet. In some aspects, however, it may be desirable to minimize the PAPR values for the data portion of the packet, because PAPR values for this portion of the packet may be higher than PAPR values for other portions of the packet. For example, in FIG. 6A, note that the PAPR values for the data portions of the packet are higher than those for the LTF portion of the packet under any of the seven illustration phase rotation sequences. Reducing the PAPR of the data symbols of a DUP frame may be more complex than reducing other portions of the DUP frame, as the data symbols of a DUP frame may not be known ahead of time, unlike, for example, the LTF portion of a DUP frame. Thus, in order to reduce the PAPR of the data symbols in a DUP frame, it may be necessary to use statistical methods.

For example, a large number of possible DUP frames with different data symbols may be constructed. These frames may be constructed randomly, may be taken from actual DUP frames or other frames that are sent over a network, or may be constructed in any number of ways. These frames may be used, at least in part, to assist in determining which phase rotation sequences may reduce the PAPR of the data symbols of a DUP frame most effectively. For example, data symbols, or the data section of a packet, may be constructed using random bits and hence, random constellation symbols. It may be beneficial to use constellations which are commonly used in practice. For example, if BPSK constellations are the most commonly-used constellations for DUP frames, it may be beneficial to randomly generate data symbols that use BPSK constellations. This may provide the best information in a determination of beneficial phase rotation sequences. In this system, the search for a phase rotation factor for each identical frequency segment of the DUP frame may be one of the values: 1, −1, j, and −j, where j is the square-root of −1. This same search space may be used for both the search for a LTF PAPR minimization phrase rotation sequence as well as a data PAPR minimization phase rotation sequence.

The randomly-generated data symbols for DUP frame testing may be generated in a number of ways. For example, a 1 MHz bandwidth signal may contain 32 subcarriers or tones. According to the IEEE 802.11 ah standard, these 32 tones may include 24 data tones, 2 pilot tones, 1 DC tone, and 5 guard tones. Of these tones, the 24 data tones and the 2 pilot tones may contain different information in packets that carry different data. Thus, in order to simulate a packet containing unknown data, it may be beneficial to randomly generate BPSK symbols or constellations for each of the 24 data tones and for the 2 pilot tones, as this may be representative of a symbol with random information in a transmission.

Another type of DUP frame may use data portions of a packet which are generated based on "MCS0 (Modulation and Coding Scheme) rep2 mode (Repetition Mode 2)." MCS0 rep2 mode packets are designed to allow for communications over larger distances, but at a slower data transfer rate. For example, a normal (MCS0 data) 1 MHz packet under an IEEE 802.11 ah standard includes 24 data subcarriers, each of which carries data independently of the other subcarriers. However, in a MCS0 rep2 packet, 12 of the data subcarriers carry data independently of the other subcarriers, while the other 12 data subcarriers carry the same data bits duplicated from the first 12 data subcarriers. Note that the second 12 data subcarriers carry the bits using an (XOR) 12-length masking sequence, in order to reduce PAPR values, as described in the IEEE 802.11ah specification. Accordingly, in a given time period, an MCS0 rep2 packet carries half as many independent data subcarriers, which reduces the data transmission rate by a factor of two. However, because the data subcarriers are duplicated, this enables such an MCS0 rep2 packet to be decoded by a device at a greater distance, thus giving such an MCS0 rep2 packet increased range. An MCS0 rep2 packet may also be transmitted in a DUP frame. For example, an 8 MHz DUP frame may be transmitted which is made up of 8 identical 1 MHz frequency segments, and each of the 1 MHz frequency segments may include the duplicated data structure of a MCS0 dup2 packet. Thus, in order to simulate an MCS0 rep2 packet, it may be desirable to randomly generate only 14 BPSK symbols, and to use 2 of these BPSK symbols as pilot tones, and the remaining 12 BPSK symbols may be used to represent data transmitted in a repetition mode. This approach may result in different PAPR values and different optimal phase rotation sequences, due to the deterministic nature of the 12 repeated bits, as there is a known mathematical relationship between the first 12 data bits and the second 12 data bits, generated using an (XOR) 12-length masking sequence.

Note that for any phase rotation sequence that is found, the important aspect of the sequence is the relation between the factors of the phrase rotation sequence to each other, rather than the values of each. For example, the sequence [j −j] is the same as the sequence [−1 1] or [1 −1], as they are all simply multiples of each other and a common factor. Thus, the resulting PAPR values from each of these phase rotation sequences will be the same.

Once a large number of DUP frames with different data symbols are generated, it may be beneficial to analyze these DUP frames to determine which phase rotation sequences may provide the greatest reduction in PAPR for the largest number of frames. This analysis may be extremely complex, and require a large amount of computing power. It may be beneficial to analyze as large a number of different DUP frames as possible for this purpose. For each DUP frame and potential phase rotation sequence, a PAPR value may be calculated, as described above.

Analysis of the PAPR values for each DUP frame and potential phase rotation sequence may be done in any number of ways. For example, a large number of different statistical or other models may be used to analyze this data. For example, it may be beneficial to generate a cumulative distribution function (CDF) for the PAPR values for each phase rotation sequence. Such a CDF may allow the calculation of a PAPR value which corresponds to various points in the distribution of PAPR values for a phase rotation sequence. For example, using this CDF, it may be possible to identify a PAPR value which will be equal to or greater than the PAPR value for 99.98% of all different packets that may be generated by a given phase rotation sequence. Alternatively, it is also possible to identify the point corresponding to a PAPR value that is greater than 25%, 50% (a median point), 75%, 90%, or 99% of the PAPR values of the various packets generated by a given phase rotation sequence.

Through many trials, it has been found that for a 2 MHz bandwidth signal, containing two identical 1 MHz frequency sequences, the optimal phase rotation sequence to statistically minimize the PAPR of the data symbol portion of a data unit is [1 −1]. This sequence results in a PAPR for the LTF portion of a data unit of 6.59 dB, and a PAPR for the data symbol portion of 12.74 dB. As before, the actual PAPR value for a data portion of a packet depends upon the data contained in the packet. However, only 0.02% of packets will have a higher PAPR value for the data portion of the packet than the given value.

Note that the PAPR value for the data portion of the packet (that is, the portion of the packet which contains the payload of the packet), 12.74 dB, is much higher than the PAPR for the LTF portion of the packet, 6.59 dB. Because the PAPR value for the data portion of the packet may be much higher than for the LTF portion of the packet, it may be beneficial to use a phase rotation sequence that is based on reducing the PAPR value of the data portion of the packet rather than the LTF portion, because this may create a packet with the lowest overall PAPR value or the lowest maximum PAPR value. That is, choosing a phase rotation sequence to minimize the PAPR value of the data portion of the packet may reduce the higher PAPR value of the packet.

Through many trials, it has been found that for a 4 MHz bandwidth signal, containing four identical 1 MHz frequency sequences, the optimal phase rotation sequence to statistically minimize the PAPR values of the data portion of a packet is [1 −1 1 1]. This sequence results in a PAPR value for the LTF portion of a packet of 6.02 dB, and a PAPR value for the data symbol portion of 12.61 dB. As before, the actual PAPR value for a data portion of a packet depends upon the data contained in the packet. However, only 0.02% of packets will have a higher PAPR value for the data portion of the packet than the given value.

Through many trials, it has been found that for an 8 MHz bandwidth signal, containing eight identical 1 MHz frequency sequences, the optimal phase rotation sequence to statistically minimize the PAPR value of the data portion of a packet is [1 −1 1 −1 1 j −1 −1]. This sequence results in a PAPR value for the LTF portion of a packet of 9.02 dB, and a PAPR value for the data portion of 12.55 dB. As before, the actual PAPR value for a data portion of a packet depends upon the data contained in the packet. However, only 0.02% of packets will have a higher PAPR value for the data portion of the packet than the given value.

In some embodiments, it may be beneficial to use a phase rotation sequence which is based, at least in part, upon minimizing the PAPR value of an LTF portion of the packet. It may also be beneficial to use a phase rotation sequence which is based, at least in part, on minimizing the PAPR value of a data portion of a packet. It may also be beneficial to choose a phase rotation sequence that minimizes another metric, such as the average of the PAPR value between the LTF and data portions, or to choose a phase rotation sequence based, at least in part, upon the PAPR values of both the LTF and data portions of a packet. It may be beneficial to choose a phase rotation sequence according to different criteria for different bandwidths. For example, it may be beneficial to choose a phase rotation sequence in 2 and 4 MHz bandwidths based upon the second criteria (that is, minimizing the PAPR value of the data portion of a packet) in chart 600, as illustrated in columns 604 and 605, as these phase rotation sequences may result in the best trade-off between PAPR of the LTF and data portions of a data unit. However, it may be beneficial to choose a phase rotation sequence based on minimizing PAPR value of the LTF portion in an 8 MHz bandwidth, as this phase rotation sequence may allow for a much smaller PAPR value for the LTF portion, while only having a marginally larger PAPR value for the data portion of a packet.

Note that, phase rotation sequences which are merely scaled versions of the above sequences will have the same results. For example, a 2 MHz DUP frame transmitted based upon the IEEE 802.11 ah standard will contain 64 subcarriers-32 subcarriers for each 1 MHz of bandwidth. These subcarriers may be numbered from −32 to +31. As above, the phase rotation sequence for such a DUP frame may be [1 −1]. The [1 −1] phase rotation sequence means that the first 32 subcarriers, numbered from −32 to −1, will have a phase rotation factor of 1. This results in no phase rotation. The [1 −1] phase rotation sequence further means that the second 32 subcarriers, numbered from 0 to +31, will have a phase rotation factor of −1. This results in a phase rotation of π radians, or 180°. However, for the purposes of calculating PAPR values for this packet, the actual phase rotations are not important. Rather, the phase rotations of the portions relative to the other portions are important. That is, it is significant that the second 32 subcarriers are rotated 180° with respect to the first 32 subcarriers. The same relative rotation would also be achieved from any scaled version of [1 −1], such as [−1 1], [j −j], and [−j j]. Accordingly, each of these phase rotation factors may be equivalent in function.

FIG. 6B shows a chart of phase rotation sequences in 2, 4 and 8 MHz bandwidths optimized based on one of two criteria, and the resulting PAPR values. In this chart 610, the two optimization criteria are to either minimize PAPR values of the LTF portion of the packet (illustrated in columns 612 and 613), or to minimize PAPR values of the data portion of the packet (illustrated in columns 614 and 615). In column 612, sequences are displayed which minimize the PAPR values for the LTF portion of the packet. Column 613 provides the PAPR values for both the LTF portion of the packet, and the PAPR values for the data portion of the packet. Note that in this case, the data values provided are for a packet which contains 26 randomly-chosen data bits (24 data tones and 2 pilot tones), as described above. In column 614, phrase rotation sequences are displayed which minimize the PAPR value of the data portion of the packet. In column 615, PAPR values are displayed for packets using those phase rotation sequences, including PAPR values for the LTF portion of the packet, PAPR values for the data portion of a packet that contains 26 randomly-chosen data bits, and PAPR values for the data portion of a MCS0 rep2 packet which, as described above, contains 14 data bits (12 data tones, which are each transmitted twice, and 2 pilot tones).

Note that in chart 610, MCS0 data represents packets which contain 26 randomly-generated bits, for each of the 24 data tones and 2 guard tones. However, MCS0 rep2 data represents packets which contain 2 randomly-generated pilot tones and 12 randomly-generated data tones, where the data tones are repeated twice in order to fill the 24 data tones. Due to the nature of MCS0 rep2 packets, a portion of the tones are mathematically based on the other tones (that is, the data tones are transmitted twice, although rotated with respect to one another), and so the PAPR values of MCS0 rep2 packets can vary from that of MCS0 packets containing 24 individually-changing data tones.

Note that the phase rotation sequences provided in both column 612 and column 614 are identical to those presented in FIG. 6, in columns 602 and 604. This is because in both of these charts, the phase rotation sequence has been optimized for the same conditions—that is, either to minimize the PAPR of the LTF portion, or to minimize the PAPR of the MCS0 data portion. However, the PAPR values listed in column 613 for MCS0 data vary from those listed in column 603, as these values are differing PAPR thresholds—columns 613 and 615 list the 1-5e$^{-3}$ point (that is, 0.5% of packets will have higher PAPR values), while column 603 lists the 1-2e$^{-4}$ point (that is, 0.02% of packets will have higher PAPR values). As before, the actual PAPR value for a data portion of a packet depends upon the data contained in the packet. However, only 0.5% of packets will have a higher PAPR value for the data portion of the packet than the given values in column 613 and column 615.

FIG. 6C shows a chart of phase rotation sequences in 2, 4 and 8 MHz bandwidths optimized based on one of two criteria, and the resulting PAPR values. As with columns 602 and 612, column 622 shows optimal phase rotation sequences to minimize the PAPR value of the LTF portion of a packet. Column 623 lists the PAPR values for the LTF portion of the packet using the provided phase rotation, and also lists the PAPR value of an MCS0 rep2 data portion of the packet using the provided phase rotation. Column 624 shows optimal phase rotation sequences to minimize the PAPR value of the data portion of a MCS0 rep2 packet, as described above. Column 625 shows the PAPR values for the LTF portion of the packet, a data portion of the packet for an MCS0 data packet, and the data portion of the packet for an MCS0 rep2 data packet. As with columns 613 and 615, the PAPR values listed in columns 623 and 625 represent PAPR values which will be greater than 99.5% of the PAPR values for packets containing random data.

For example, in a 2 MHz DUP frame, the best phase rotation sequence to minimize LTF PAPR is [1 1]. Using this sequence, the PAPR value of the data portion of an MCS0 rep2 packet will be 14.08 dB or less 99.5% of the time. Similarly, for the optimal phase rotation sequence to minimize PAPR values for the LTF portion of the packet of a 4 MHz DUP frame, [1 1 1 −1], the PAPR value of the data portion of an MCS0 rep2 packet will be 13.25 dB or less 99.5% of the time. In an 8 MHz DUP frame, the best phase rotation sequences to minimize PAPR value of the LTF portion of the packet are [1 1 −1 −1 −1 −1 1 −1] and [1 −1 1 1 1 −1 −1]. These phase rotation sequences result in PAPR values of the data portion of an MCS0 rep2 packet of 12.95 dB and 12.94 dB or less 99.5% of the time, respectively.

In a 2 MHz DUP frame, the optimal phase rotation sequence in order to minimize the PAPR value of the data portion of an MCS0 rep2 packet is [1 −1], as shown in column 624. Using this phase rotation sequence, the PAPR value of the LTF portion of a packet will be 6.59 dB, while the PAPR value of the data portion of an MCS0 packetwill be below 11.65 dB 99.5% of the time, and the PAPR value of the data portion of an MCS0 rep2 packet will be below 12.09 dB 99.5% of the time.

In a 4 MHz DUP frame, the optimal phase rotation sequence in order to minimize the PAPR value of the data portion of a MCS0 rep2 packet is [1 j −j −1]. Using this phase rotation sequence, the PAPR value of the LTF portion of a packet will be 6.59 dB, while the PAPR value of the data portion of an MCS0 packet will be below 11.58 dB 99.5% of the time, and the PAPR value of the data portion of an MCS0 rep2 packet will be below 11.81 dB 99.5% of the time.

In an 8 MHz DUP frame, the optimal phase rotation sequence in order to minimize the PAPR value of the data portion of an MCS0 rep2 packet is [1 −1 1 −1 1 −1 −1 −1]. Using this phase rotation sequence, the PAPR value of the LTF portion of the packet will be 10.11 dB, while the PAPR value of the data portion of an MCS0 packet will be below 11.58 dB 99.5% of the time, and the PAPR value of the data portion of an MCS0 rep2 packet will be below 12.22 dB 99.5% of the time.

In choosing which phase rotation sequence to use, it may be beneficial to consider the PAPR value of each of the LTF portion of the packet, and the data portions of both MCS0 packets and MCS0 rep2 packets. Each phase rotation sequence disclosed may lower PAPR values for some types of packets/data units or for at least some portions of data units, but may raise PAPR values for other types of data units or for at least some other portions of data units. In some embodiments, it may be beneficial to choose a phase rotation sequence based, at least in part, on which phase rotation sequence gives the best combination of PAPR values for each of the LTF portion of a packet, the data portion of an MCS0 packet, and the data portion of an MCS0 rep2 packet. For example, the phase rotation sequence which optimizes PAPR values of the LTF portion of an 8 MHz DUP frame may result in only slightly higher PAPR values for the data portions of MCS0 packets and MCS0 rep2 packets, while resulting in much lower PAPR values for the LTF portion of those packets than other phase rotation factors. Therefore, in some embodiments, it may be beneficial to choose a phase rotation sequence for 8 MHz DUP frames that minimizes PAPR values for the LTF portion of a packet. Similar considerations may be made in choosing a phase rotation sequence for 4 MHz DUP frames. In some embodiments, it may be preferable to choose a phase rotation sequence based, at least in part, on which type of data unit—such as MCS0 packets or MCS0 rep2 packets—is most likely to be found in DUP frames.

Figure 7:
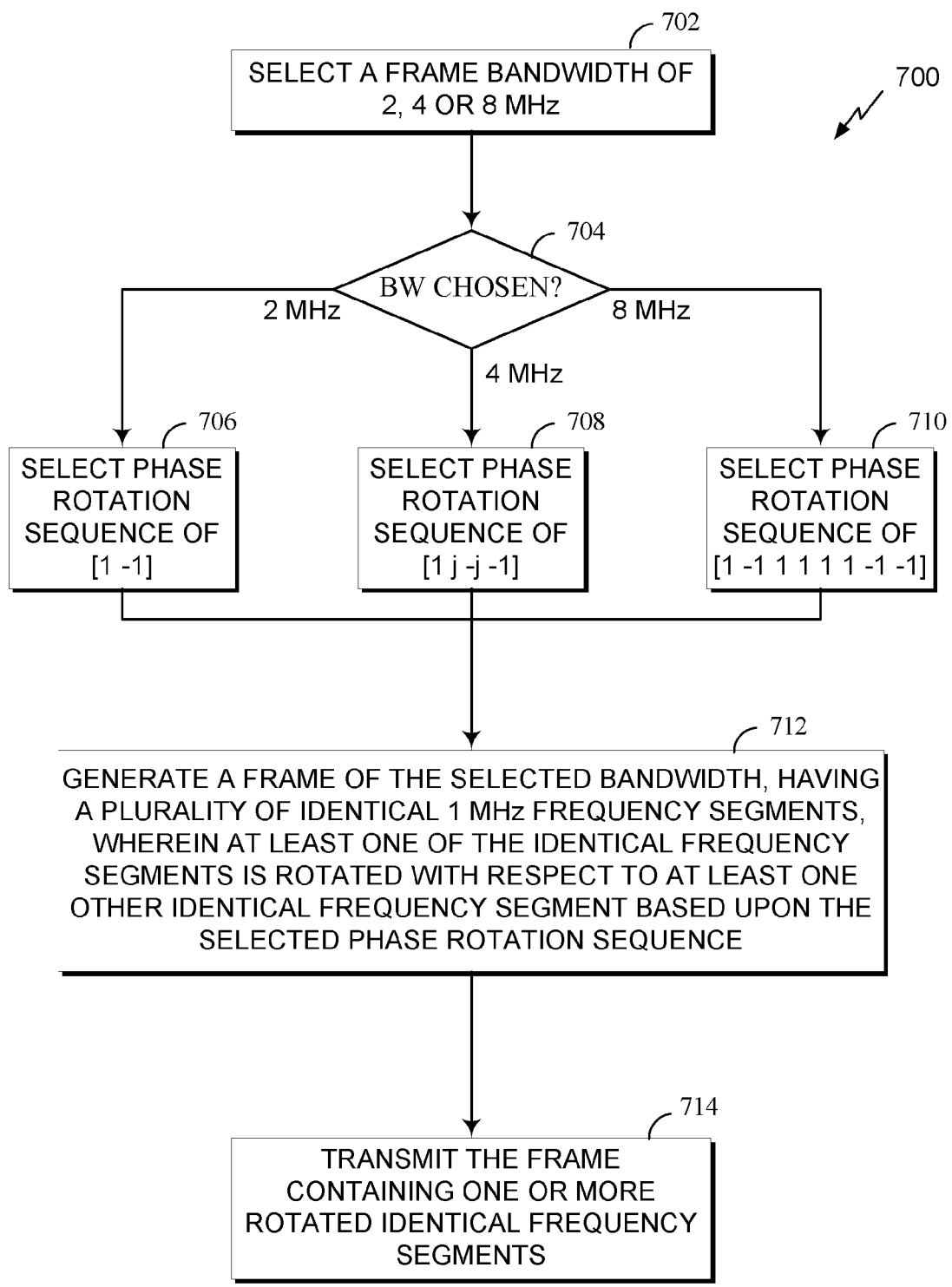
FIG. 7 shows a flow chart of an aspect of an exemplary method for generating and transmitting a duplicate frame.

FIG. 7 shows a flow chart of an aspect of an exemplary method for generating and transmitting a DUP frame. This method may be performed by a device such as an AP.

At block 702, the AP selects a frame bandwidth of 2, 4, or 8 MHz. For example, the AP may select this bandwidth based upon the bandwidth that is available in the local area, the bandwidths that other devices on the network may be configured to use, or based on other factors. The selected bandwidth will be used for the transmission of a duplicate frame, which includes a number of identical 1 MHz frame segments, duplicated over the frame bandwidth. For example, these 1 MHz frame segments may be duplicated over a number of adjacent 1 MHz channels. In some aspects, the frame bandwidth may be less than an operating channel width of the AP. In these cases, the AP may transmit the frame using a primary channel of the specified bandwidth, such as a primary 2 MHz, 4 MHz, or 8 MHz channel. The frame may include duplicated RTS-CTS frames, or duplicated CTS frames. In some aspects, the means for selecting a frame bandwidth may include a processor.

At block 704, the AP determines which bandwidth was chosen, in order to select a phrase rotation sequence based, at least in part, on the chosen bandwidth. At block 706, if the chosen frame bandwidth is 2 MHz, a phase rotation sequence of [1 −1] may be chosen. At block 708, if the chosen frame bandwidth is 4 MHz, a phase rotation sequence of [1 j −j −1] may be chosen. At block 710, if the chosen frame bandwidth is 8 MHz, a phase rotation sequence of [1 −1 1 1 1 1 −1 −1] may be chosen. In each of these blocks, the various identical frequency segments will be rotated with respect to each other, according to the provided phase rotation sequence. In each block, the rotation may also be done according to a multiple of the provided phase rotation sequence. For example, for a 2 MHz frame bandwidth, a phase rotation sequence of [−1 1] may also be used, as this is [1 −1] multiplied by −1. In some aspects, rotating the various segments of the frame based upon a multiple of the phase rotation sequence may be the same as rotating the frequency segments based on the provided phase rotation sequences. In some aspects, these particular phase rotation sequences may minimize PAPR of the duplicate frame, for a majority of the different possible duplicate frames. In some aspects, the means for selection a phase rotation sequence may be a processor.

At block 712, the AP generates a frame of the selected bandwidth, having a plurality of identical 1 MHz frequency segments, wherein at least one of the identical frequency segments is rotated with respect to at least one other identical frequency segments based upon the selected phase rotation sequence. For example, these rotations may be based upon either the provided phase rotation sequences, or a multiple of those sequences. The frame may be a 2, 4 or 8 MHz frame, including 2, 4 or 8 identical 1 MHz frequency segments. Each of these identical frequency segments may be duplicated a number of times, with some or all of the copies rotated with respect to one another. In some aspects, this rotation may be done to reduce the PAPR of the duplicate frame. In some aspects, each of the 1 MHz frequency segments may include 32 subcarriers. In some aspects, the means for generating a frame includes a processor.

At block 714, the AP may transmit the frame containing one or more rotated identical frequency segments. In some aspects, the means for transmitting the frame may include a transmitter. For example, in some aspects, the AP may transmit a 1 MHz duplicate PPDU (or frame), using two adjacent 1 MHz channels. If an operating channel of the AP is wider than 2 MHz, the transmission may be transmitting in a primary 2 MHz channel of the AP. For such a 2 MHz transmission, the phase rotation sequence used may be [1 −1]. In some aspects, the AP may transmit a 1 MHz duplicate PPDU (or frame), using four adjacent 1 MHz channels. If an operating channel of the AP is wider than 4 MHz, the transmission may be transmitting in a primary 4 MHz channel of the AP. For such a 4 MHz transmission, the phase rotation sequence used may be [1 j −j −1]. In some aspects, the AP may transmit a 1 MHz duplicate PPDU (or frame), using eight adjacent 1 MHz channels. If an operating channel of the AP is wider than 8 MHz, the transmission may be transmitting in a primary 8 MHz channel of the AP. For such a 8 MHz transmission, the phase rotation sequence used may be [1 −1 1 1 1 1 −1 −1].

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-7 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wireless communication apparatus, comprising:
   a processor configured to:
      select a frame bandwidth of one of 2 MHz, 4 MHz, and 8 MHz;
      select a phase rotation sequence based at least in part on the frame bandwidth, comprising:
         if the frame bandwidth selected is 2 MHz, selecting a phase rotation sequence of [1 −1], or a scaled version of [1 −1];
         if the frame bandwidth selected is 4 MHz, selecting a phase rotation sequence of [1 j −j −1], or a scaled version of [1 j −j −1]; and
         if the frame bandwidth selected is 8 MHz, selecting a phase rotation sequence of [1 −1 1 1 1 1 −1 −1], or a scaled version of [1 −1 1 1 1 1 −1 −1]; and
      generate a frame of the selected frame bandwidth, the frame having a plurality of identical 1 MHz frequency segments wherein at least one of plurality of the identical 1 MHz frequency segments is rotated with respect to at least one other frequency segment of the plurality of identical 1 MHz frequency segments based upon the selected phase rotation sequence; and
   a transmitter configured to transmit the frame, each of the identical plurality of identical 1 MHz frequency segments being transmitted in adjacent 1 MHz channels.

2. The wireless communication apparatus of claim 1, wherein the at least one of the plurality of identical 1 MHz frequency segments is rotated for reducing a peak-to-average power ratio of at least a portion of the frame.

3. The wireless communication apparatus of claim 1, wherein the at least one of the identical plurality of 1 MHz frequency segments is rotated for reducing a peak-to-average power ratio of at least one of a data portion and an LTF portion of the frame.

4. The wireless communication apparatus of claim 1, wherein each of the identical plurality of 1 MHz frequency segments comprise a data segment of a packet.

5. A method of transmitting a duplicate frame over a wireless communication network, the method comprising:
   selecting a frame bandwidth of one of 2 MHz, 4 MHz, and 8 MHz;
   selecting a phase rotation sequence based at least in part on the frame bandwidth, comprising:
      if the frame bandwidth selected is 2 MHz, selecting a phase rotation sequence of [1 −1], or a scaled version of [1 −1];
      if the frame bandwidth selected is 4 MHz, selecting a phase rotation sequence of [1 j −j −1], or a scaled version of [1 j −j −1]; and
      if the frame bandwidth selected is 8 MHz, selecting a phase rotation sequence of [1 −1 1 1 1 1 −1 −1], or a scaled version of [1 −1 1 1 1 1 −1 −1];
   generating a frame of the selected frame bandwidth, the frame having a plurality of identical 1 MHz frequency segments, wherein at least one of the plurality of identical 1 MHz frequency segments is rotated with respect to at least one other frequency segment of the plurality of identical 1 MHz frequency segments based upon the selected phase rotation sequence; and
   transmitting the frame, each of the identical plurality of identical 1 MHz frequency segments being transmitted in adjacent 1 MHz channels.

6. The method of claim 5, wherein the at least one of the plurality of identical 1 MHz frequency segments is rotated for reducing a peak-to-average power ratio of at least a portion of the frame.

7. The method of claim 5, wherein at the least one of the plurality of identical 1 MHz frequency segments is rotated for reducing a peak-to-average power ratio of at least one of a data portion and/or an LTF portion of the frame.

8. The method of claim 5, wherein the each of the plurality of identical 1 MHz frequency segments comprise a data segment of a packet.

9. A non-transitory, computer readable medium comprising instructions that when executed cause a processor in a device to perform a method of transmitting a duplicate frame over a wireless communication network, the method comprising:
   selecting a frame bandwidth of one of 2 MHz, 4 MHz, and 8 MHz;
   selecting a phase rotation sequence based at least in part on the frame bandwidth, comprising:
      if the frame bandwidth selected is 2 MHz, selecting a phase rotation sequence of [1 −1], or a scaled version of [1 −1];
      if the frame bandwidth selected is 4 MHz, selecting a phase rotation sequence of [1 j −j −1], or a scaled version of [1 j −j −1]; and
      if the frame bandwidth selected is 8 MHz, selecting a phase rotation sequence of [1 −1 1 1 1 1 −1 −1], or a scaled version of [1 −1 1 1 1 1 −1 −1];
   generating a frame of the selected frame bandwidth, the frame having a plurality of identical 1 MHz frequency segments, wherein at least one of the plurality identical 1 MHz frequency segments is rotated with respect to at least one other frequency segment of the plurality of identical 1 MHz frequency segments based upon the selected phase rotation sequence; and
   transmitting the frame, each of the identical plurality of identical 1 MHz frequency segments being transmitted in adjacent 1 MHz channels.

10. The non-transitory, computer readable medium of claim 9, wherein the at least one of the plurality of identical 1 MHz frequency segments is rotated for reducing a peak-to-average power ratio of at least a portion of the frame.

11. The non-transitory, computer readable medium of claim 9, wherein the at least one of the plurality of identical 1 MHz frequency segments is rotated for reducing a peak-to-average power ratio of at least one of a data portion and/or an LTF portion of the frame.

12. The non-transitory, computer readable medium of claim 9, wherein each of the plurality of identical 1 MHz frequency segments comprise a data segment of a packet.

\* \* \* \* \*